US006209174B1

(12) United States Patent
Selby

(10) Patent No.: US 6,209,174 B1
(45) Date of Patent: Apr. 3, 2001

(54) ONE-PIECE MOLDED STRAP

(76) Inventor: William J. Selby, 1530 West Dr., Stoughton, MA (US) 02072

( * ) Notice: Subject to any disclaimer, the term of this patent is extended or adjusted under 35 U.S.C. 154(b) by 0 days.

(21) Appl. No.: 09/226,438

(22) Filed: Jan. 6, 1999

(51) Int. Cl.[7] ........................... A44B 21/00; F16G 11/00; B41F 27/00; B65D 63/00

(52) U.S. Cl. ........................ 24/265 H; 24/300; 24/598.5; 101/415.1

(58) Field of Search ................................ 24/265 H, 300, 24/598.5, 712, 715.3, 905

(56) References Cited

U.S. PATENT DOCUMENTS 2,059,825 * 11/1936 Talbott ............................... 24/265 H
2,500,561 * 3/1950 Norton ................................... 24/300
2,861,311 * 11/1958 Kurland ................................. 24/300
2,931,085 * 4/1960 Benlian .............................. 24/265 H
3,934,509 * 1/1976 Saunders et al. ................. 101/415.1
4,559,677 * 12/1985 Tracy ..................................... 24/300
5,088,408 * 2/1992 Philpot ............................. 101/415.1
5,168,605 * 12/1992 Bartlett .................................. 24/300
5,638,584 * 6/1997 De Anfrasio ........................... 24/300
5,797,167 * 8/1998 Schwab .................................. 24/300
5,970,585 * 10/1999 Scholey ................................. 24/300

* cited by examiner

*Primary Examiner*—Victor N. Sakran
(74) *Attorney, Agent, or Firm*—Steven N. Fox, Esq.

(57) ABSTRACT

The present invention is a one-piece molded strap used to secure a printing plate to a drum of a high speed roller machine. The one-piece molded strap comprises a one-piece molded body comprising an elastomeric portion, a rigid latch portion, and a rigid elongated body portion. The rigid latch portion is integrally formed with and chemically bonded to one end of the elastomeric portion. The rigid elongated body portion is integrally formed with and chemically bonded to the other end of the elastomeric portion. The one-piece molded strap is formed by an injection molding process wherein the material composition of the rigid latch portion and the rigid elongated body portion are compatible with the material composition of the elastomeric portion.

2 Claims, 3 Drawing Sheets

ONE-PIECE MOLDED STRAP

FIELD OF THE INVENTION

The present invention relates to devices used to secure a printing plate to a high speed roller machine.

BACKGROUND OF THE INVENTION

High speed roller machines are used to imprint a desired pattern on a variety of commercial articles. Typically, a printing plate having a desired pattern to be imprinted upon the article is attached to a drum of the high speed roller machine. Conventional high speed roller machines have used a multiple-piece strap to secure the printing plate to the drum. Such conventional multiple-piece straps consist of a rigid latch member connected to a rigid body member by a preformed elastomeric interconnect member. The rigid latch member and the rigid body member are each secured to the elastomeric member by an adhesive material. Such conventional multiple-piece straps have several drawbacks. By way of example only, exposure of such conventional multiple-piece straps to high rotational speeds over a short period of time causes the adhesive to degrade which results in the rigid latch members and/or the rigid body member becoming disengaged from the elastomeric interconnect member and ultimately the failure of the strap to secure the printing plates to the drum of the high speed roller machine.

The principal object of the present invention is to develop a strap for securing printing plates to a high speed roller machine which is significantly stronger and more durable then conventional straps thereby increasing the life of the strap and a process for manufacturing the same.

Another object of the present invention is to develop a strap for securing printing plates to a high speed roller machine which is less expensive to produce then conventional straps and a process for manufacturing the same.

SUMMARY OF THE INVENTION

The present invention is a one-piece molded strap used to secure a printing plate to a drum of a high speed roller machine. The one-piece molded strap comprises a rigid latch portion, a rigid elongated body portion and an elastomeric portion. The rigid latch portion is integrally formed with and chemically bonded to one end of the elastomeric portion. The rigid elongated body portion is integrally formed with and chemically bonded to the other end of the elastomeric portion. The one-piece molded strap is formed by an injection molding process whereby the material composition of the rigid latch portion and the rigid elongated body portion are compatible with the material composition of the elastomeric portion.

BRIEF DESCRIPTION OF THE DRAWINGS

The following description of the invention will be better understood with reference to the accompanying drawings in which.

DETAILED DESCRIPTION OF THE PREFERRED EMBODIMENTS

Figure 1:
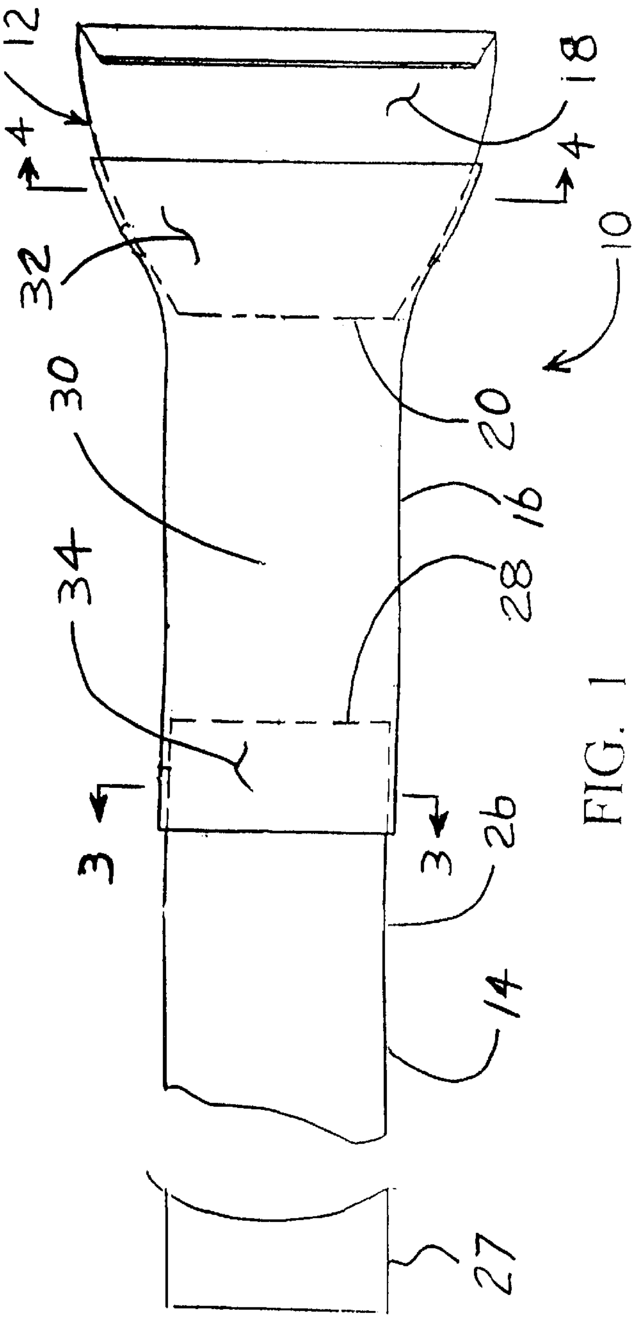
FIG. 1 is a bottom plan view of the one-piece strap of the present invention.
Figure 2:
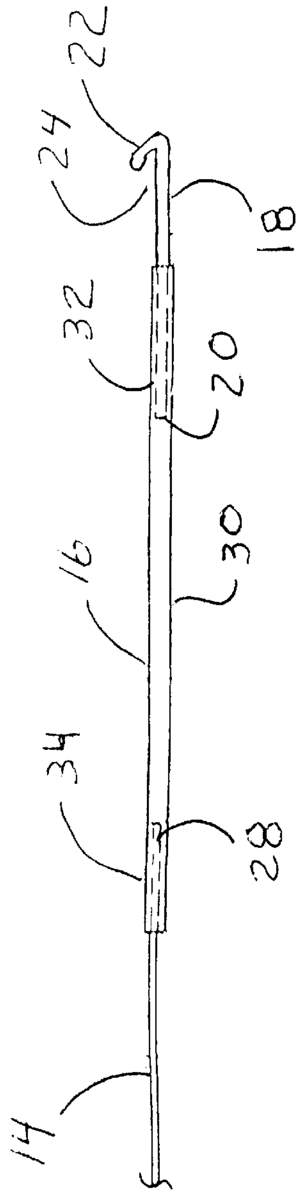
FIG. 2 is a side view of the one-piece strap of the present invention.
Figure 3:
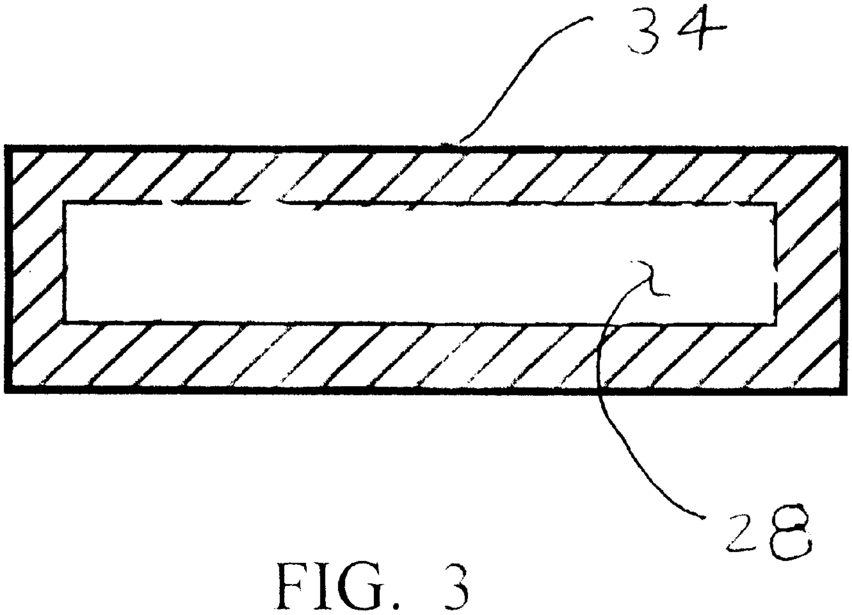
FIG. 3 is a section view taken along line 3—3 of FIG. 1.
Figure 4:
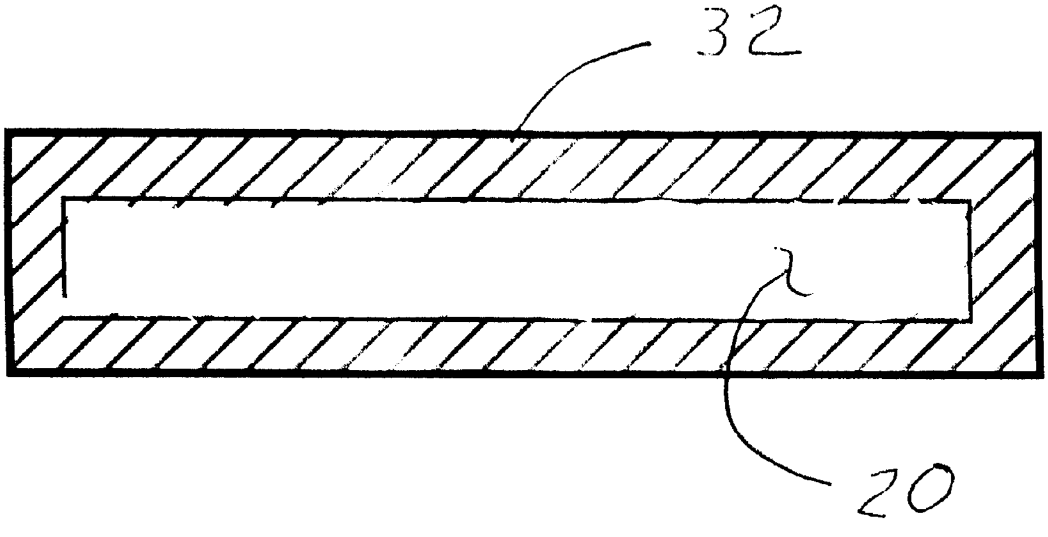
FIG. 4 is a section view taken along line 4—4 of FIG. 1.

The present invention is a one-piece strap for quickly securing one or more printing plates to a drum or cylinder of a high speed roller machine. Referring to FIGS. 1–4, wherein a first embodiment of the one-piece molded strap 10 of the present invention is shown generally comprising a latch or grip member 12 connected to an elongated body member 14 by an elastic interconnect member 16.

The latch member 12 generally comprises a substantially planar median portion 18, a substantially planar first end portion 20 which is engaged with the interconnect member 16 (to be described) and a second end portion 22 which is secured to the drum and/or cylinder of a high speed roller machine (not shown). The second end portion 22 is bent upward to form a clip or gripping area 24 which is secured to the drum by a variety of means including slots and/or flanges (not shown) provided in the drum. The latch member 12 is preferably made from a rigid and high strength material such as nylon or polyproplyene and is preferably manufactured by an injection molding process.

The elongated member 14 may take a variety of different lengths depending upon the size of the roller and generally comprises a substantially planar median portion 26, a substantially planar end portion 27 and a substantially planar end portion 28. The end portion 28 is securely engaged with the interconnect member 16 (to be described) and the end portion 27 is secured to the roller by a variety of means including being folded within slots (not shown) provided in the roller. The elongated member 14 is preferably made from a rigid and high strength material such as nylon or polypropelene and is manufactured by an injection molding process.

The interconnect member 16 generally comprises a median portion 30 and first and second end portions 32 and 34. The first end portion 32 is securely engaged with the second end portion 20 of the latch member 12. The second end portion 34 is securely engaged with the end portion 28 of the elongated member 14. The interconnect member 16 is preferably made from a highly elastic material containing a chemical bonding agent such as thermo plastic rubber (TPR) or TPO. The elasticity of the interconnect member 16 allows the latch member 12 and the elongated member 14 to be pulled apart or stretched as desired and to securely hold the printing plate upon the drum under tension and during high speed printing operations. The material composition of the interconnect member 16 is compatible with the material composition of the latch member 12 and the elongated body member 14. The interconnect member 16 is preferably molded with and about the second end portion 20 of the latch member 12 and the end portion 28 of the elongated member 14 and chemically bonded thereto to form a one-piece molded structure. The one-piece molded strap 10 is significantly stronger and more durable than conventional multiple-piece straps. Unlike conventional multiple-piece straps, the latch member 12 and/or the elongated member 14 will not become disengaged from the interconnect member 16 when exposed to high rotational speeds thereby providing secure and reliable engagement of the printing plates to the drum of the high speed roller machine.

Figure 5:
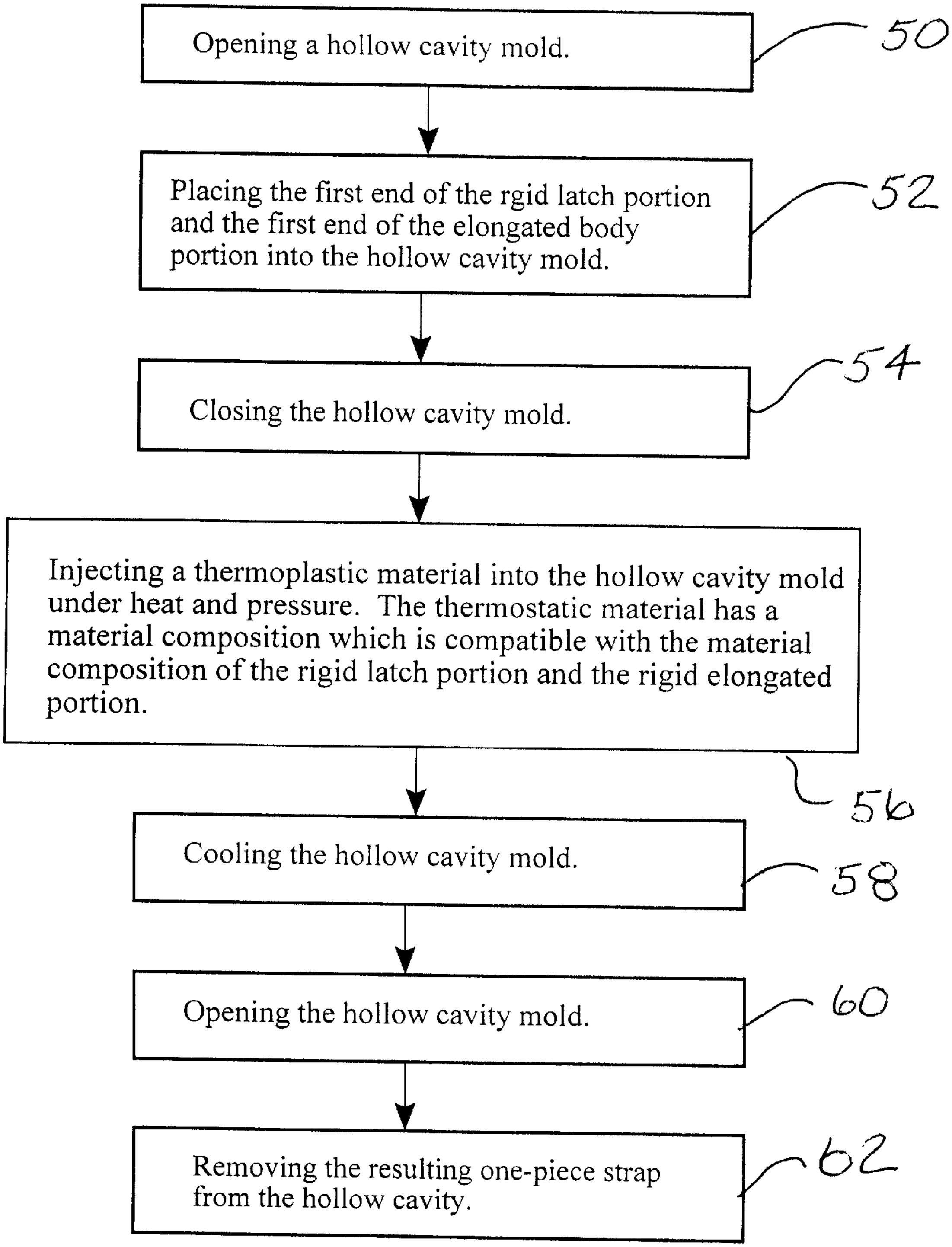
FIG. 5 is a flow chart showing one embodiment of a process for forming the one piece strap of the present invention.

Referring to FIG. 5, wherein a process for manufacturing the one-piece molded strap 10 of the present invention is described. As shown by block 50, the process comprises the step of opening a hollow cavity mold. As shown by block 52, the process comprises the step of placing said first end of said rigid latch portion and said first end of said rigid elongated body portion into the hollow cavity mold. As shown by block 54, the process comprises the step of closing the hollow cavity mold. As shown by block 56, the process comprises the step of injecting a thermoplastic material into the hollow cavity mold under heat and pressure. The thermoplastic material has a material composition which is compatible with the material composition of the rigid latch portion and the rigid elongated body portion. As shown by block 58, the process comprises the step of cooling the hollow cavity mold. As shown by block 60, the process comprises the step of opening the hollow cavity mold. As shown by block 62, the process comprises the step of removing the resulting one-piece strap from the hollow cavity mold.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed:

1. A strap secured to a printing plate to a drum of a high speed roller machine, the strap comprising a one piece molded body comprising an elastomeric portion having first and second ends; a rigid latch portion having first and second ends; a rigid elongated body portion having first and second ends; said first end of said rigid latch portion being integrally formed to said first end of said elastomeric portion; and said first end of said rigid body portion being integrally formed to said first end of said elastomeric portion, said elastomeric portion being made from a thermoplastic material, said rigid latch portion and said rigid body portion being made from a polymer material which can chemically bond with said elastomeric material such that said first end of said rigid latch portion is chemical bonded only to said first end of said elastomeric portion and said first end of said rigid elongated body portion is chemical bonded only to said second end of said elastomeric portion.

2. The strap of claim 1 wherein said rigid elongated body portion is substantially flat.

* * * * *